March 19, 1935. C. E. GREGORY 1,994,471
AUTOMATIC TRANSMISSION
Filed July 7, 1933 2 Sheets-Sheet 2

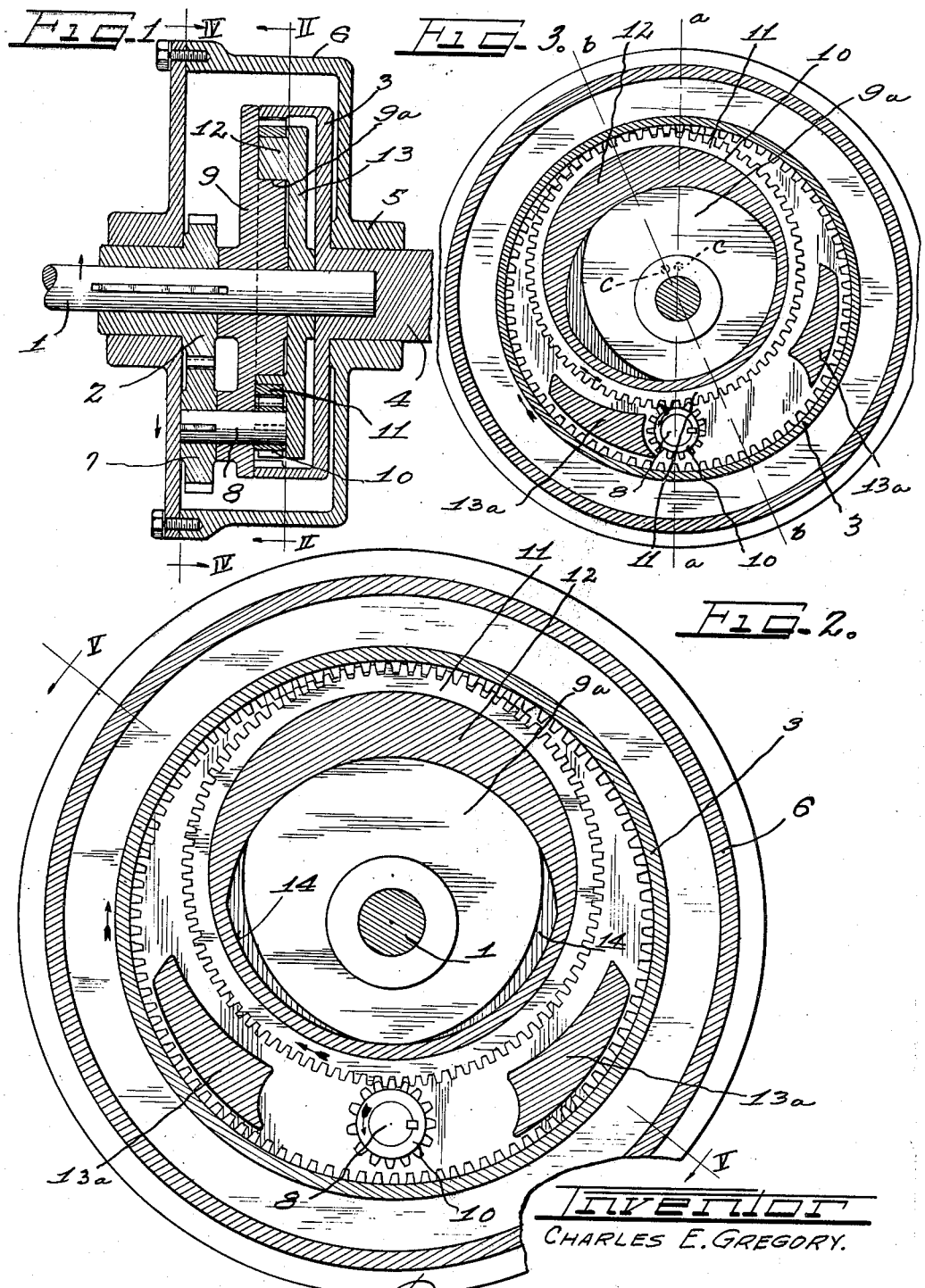

Inventor
CHARLES E. GREGORY.

Patented Mar. 19, 1935

1,994,471

UNITED STATES PATENT OFFICE 1,994,471

AUTOMATIC TRANSMISSION

Charles E. Gregory, Chicago, Ill.

Application July 7, 1933, Serial No. 679,298

7 Claims. (Cl. 74—259)

This invention relates to a transmission involving a driven member, a driving member and an eccentrically mounted member between the driven and driving member and concerns itself primarily with means for relatively shifting certain parts to prevent the driving member from traveling in an orbit.

The invention comprises the novel structure and combination of parts hereinafter described and more particularly pointed out and defined in the appended claims.

In the accompanying drawings which illustrate a preferred form of this invention and in which similar reference numerals refer to similar features in the different views:

Figure 1 is a sectional view of the transmission involving this invention.

Figure 2 is an enlarged sectional view of the transmission taken upon the line II—II of Fig. 1 looking in the direction of the arrows.

Figure 3 is a view similar to Fig. 2 but upon a reduced scale showing parts in a different position.

Figure 4:
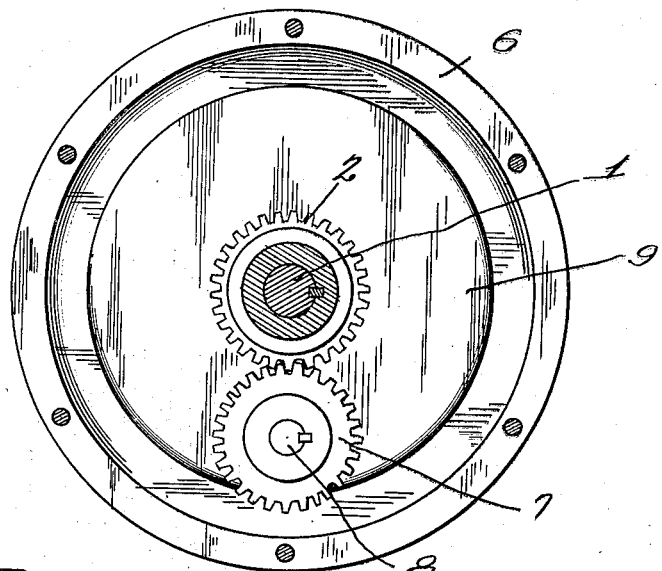
Figure 4 is an enlarged sectional view taken upon the line IV—IV of Fig. 1 looking in the direction of the arrows.
Figure 5:
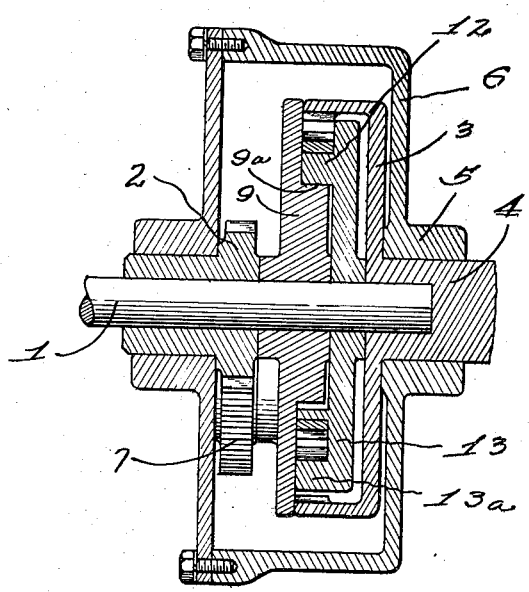
Figure 5 is a reduced sectional view taken upon the line V—V of Fig. 2 looking in the direction of the arrows.

In the drawings, there is shown a driving shaft 1 having a gear 2 keyed thereon which is adapted to drive a driven member 3, as will later more fully appear. The driven member 3 is in the form of an internal gear having a hub 4 in which the inner end of the driving shaft is journalled. The hub 4 is journalled in a bearing 5 which is integral with a casing 6 surrounding the transmission.

The aforementioned gear 2 meshes with a gear 7 keyed upon a shaft 8 which is journalled in a bearing disk 9 journalled upon the shaft 1. A driving gear 10 is secured upon the inner end of the shaft 8 upon the opposite side of the disk and meshes with an eccentrically mounted ring gear 11 journalled upon an eccentric bearing 12 carried by a disk 13 journalled upon the shaft 1 and having counterweights 13a thereon. It will be noted that the bearing 12 is eccentric with relation to the shaft 1 and surrounds an eccentric bearing 9a on the disk 9. With reference to Fig. 2 it will be noted that there is a clearance 14 between the bearing 12 and the bearing 9a upon each side of the bearing 9a allowing the bearing 12 to rock or turn from the position shown in Fig. 2 to the position shown in Fig. 3 to take up one of the clearances 14. By turning the bearing in the other direction, the other clearance will be taken up.

Assuming that the parts are in the position shown in Fig. 2 and power is applied for rotating the pinion 10 in the direction indicated by the arrow thereon. This operation will tend to rotate the ring gear 11 in the direction indicated by the arrow thereon, and cause the bearing 12 to shift from the position shown in Fig. 2 to the position shown in Fig. 3 and as indicated by the lines a—a and b—b in Fig. 3, due to the clearance 14 upon the right side. In this position of the parts, the pinion 10 is locked against bodily rotation in an orbit to the right, it can, however, rotate upon its axis or bodily rotate toward the left.

For it will be evident that the center C of the bearing 12 in its shifted position is nearer to the axis of the pinion 10 than it was in its original position, thereby causing the ring gear 11 to bind against the pinion 10. In other words, the shifting of the bearing 12 as soon as the pinion 10 starts to rotate, brings a deeper portion of the ring gear 11 to the right of such pinion 10 and prevents bodily rotation of such pinion to the right in an orbital path.

There are, however, times when the pinion 10 will bodily move toward the left. There are also times when the gear assembly will rotate as a unit as will now be set forth. Under maximum load, the pinion 10 will rotate ring gear 11 so that the torque will be multiplied for driving gear 3. As the maximum load decreases and approaches the torque, the pinion 10 will move relative to the ring gear and when the load equals the torque, the gear assembly will rotate as a unit. Thus it will be seen that the torque is balanced by such loads as can be moved by the engine or source of power that operates the transmission.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a transmission mechanism, a driving shaft, a gear keyed thereon, a disk loosely mounted upon said shaft, a shaft journalled in and extending thru said disk, a gear secured upon one end of said shaft and meshing with the first mentioned gear, a pinion secured upon the other end of said shaft, said disk having an eccentric bearing, an eccentric bearing, an eccentric bearing ring upon said eccentric bearing and capable of being shifted relative thereto, a ring gear journalled upon said bearing ring and meshing with said pinion and an internal gear supported coaxially with said shaft and meshing with said ring gear.

2. In a transmission mechanism, a main shaft, a gear keyed thereon, a disk journalled upon said shaft, a shaft journalled in said disk, a gear upon said shaft and meshing with the first mentioned gear, a bearing having a different center of rotation than said shaft surrounding the same, a ring gear journalled upon said bearing, a pinion upon said second shaft for engaging said ring gear, and an internal gear coaxially mounted with said main shaft, and engaging said ring gear.

3. In a transmission mechanism, a gear having internal teeth, a ring gear mounted within said internal gear and meshing therewith, a pinion mounted exteriorly of said ring gear for orbital movement and meshing with said ring gear and means for causing said pinion to interlock with said ring gear upon the initial rotation of said pinion.

4. In a transmission mechanism, an internal gear, a ring gear within said internal gear and meshing therewith, a pinion exterior of said ring gear and meshing therewith, means for mounting said pinion for movement in an orbital path, and means for shifting said ring gear upon the initial rotation of said pinion to cause a binding relation between said pinion and ring gear.

5. In a transmission mechanism, an internal gear, a ring gear interiorly of said internal gear and meshing therewith, an eccentric mounting extending interiorly of the ring gear, a driving pinion engaging said ring gear and a cam member within said mounting for shifting said eccentric mounting.

6. In a transmission mechanism, a gear having internal teeth, a ring gear within said internal gear and meshing therewith, a pinion exteriorly of said ring gear and meshing therewith, means for mounting said pinion for movement in an orbital path, and means including a shiftable bearing within said ring gear for varying the center of said ring gear in relation to the center of said pinion.

7. In a transmission mechanism, an internal gear, a ring gear within said internal gear and meshing therewith, an eccentric mounting for said ring gear means for changing the eccentricity of said mounting and a bodily movable pinion meshing with said ring gear.

CHARLES E. GREGORY.